United States Patent [19]
Gäng et al.

[11] Patent Number: 6,007,587
[45] Date of Patent: *Dec. 28, 1999

[54] LEUCO VAT DYE PREPARATIONS IN GRANULE FORM

[75] Inventors: Manfred Gäng, Bobenheim-Roxheim; Rudolf Krüger, Weisenheim; Peter Miederer, Hassloch; Eberhard Beckmann, Neustadt, all of Germany

[73] Assignee: BASF Aktiengesellschaft, Ludwigshafen, Germany

[*] Notice: This patent is subject to a terminal disclaimer.

[21] Appl. No.: 09/147,407

[22] PCT Filed: Jun. 5, 1997

[86] PCT No.: PCT/EP97/02912

§ 371 Date: Dec. 18, 1998

§ 102(e) Date: Dec. 18, 1998

[87] PCT Pub. No.: WO97/48770

PCT Pub. Date: Dec. 24, 1997

[30] Foreign Application Priority Data

Jun. 18, 1996 [DE] Germany .............. 196 24 208

[51] Int. Cl.⁶ ...................................... D06P 1/22
[52] U.S. Cl. ............................................. 8/653
[58] Field of Search ........................... 8/650–653

[56] References Cited

U.S. PATENT DOCUMENTS 4,113,427  9/1978  Fono et al. .
5,586,992  12/1996  Schnitzer et al. .
5,637,116  6/1997  Gaeng et al. .
5,888,254  3/1999  Gäng et al. .

FOREIGN PATENT DOCUMENTS

| 417 071 | 11/1910 | France . |
| 235 047 | 8/1908 | Germany . |
| 200 914 | 11/1919 | Germany . |
| 10 71 653 | 12/1959 | Germany . |
| 43 27 221 | 2/1995 | Germany . |
| 195 02 968 | 8/1996 | Germany . |
| 24605 | of 1909 | United Kingdom . |
| 276023 | 11/1928 | United Kingdom . |
| 855494 | 11/1960 | United Kingdom . |
| 884027 | 12/1961 | United Kingdom . |
| 916 519 | 1/1963 | United Kingdom . |
| WO 94/23114 | 10/1994 | WIPO . |
| WO 95/05421 | 2/1995 | WIPO . |
| WO 96/23841 | 8/1996 | WIPO . |

*Primary Examiner*—Margaret Einsmann
*Attorney, Agent, or Firm*—Oblon, Spivak, McClelland, Maier & Neustadt, P.C.

[57] ABSTRACT

Granules comprising as essential constituents a leuco vat dye, an alkali metal hydroxide and a mixture of from 10 to 100% by weight of an $\alpha$-hydroxy-$C_1$–$C_4$-alkylsulfinic acid, one of its salts or derivatives and from 0 to 90% by weight of hydrosulfite as reductant, are prepared and used for dyeing cellulosic textile material.

8 Claims, No Drawings

LEUCO VAT DYE PREPARATIONS IN GRANULE FORM

Leuco vat dye preparations in granule form

The present invention relates to novel leuco vat dye preparations in granule form comprising as essential constituents a leuco vat dye, an alkali metal hydroxide and a mixture of from 10 to 100% by weight of an α-hydroxy-$C_1$-$C_4$-alkylsulfinic acid, one of its salts or derivatives and from 0 to 90% by weight of hydrosulfite as reductant.

The present invention further relates to the formation of these leuco vat. dye preparations and to their use for dyeing cellulosic textile material.

Indigoid dyes (especially indigo itself and its bromine derivatives such as Brilliant Indigo) and anthraquinonoid dyes (especially nitroviolanthrone (C.I. Vat Green 9)) are well known vat dyes, which are used for dyeing cellulosic textile material.

For dyeing the water-insoluble vat dye first has to be reduced (vatted) to convert it into the water-soluble leuco form, which has affinity for the fiber and which, after going onto the material to be dyed, is oxidized back to the water-insoluble vat dye pigment.

In existing dyeing processes, the vat dye is vatted in an alkaline medium in a vessel upstream of the dyebath by addition of inorganic reductants such as hydrosulfite (sodium dithionite) and thiourea dioxide or else organic reductants such as hydroxyacetone. Additional machine-dependent portions of reductant are consumed during dyeing, since some of the leuco dye is oxidized by air contact in the air passages and at the dyebath surface and has to be revatted, which is why small amounts of reductant also have to be added to the dyebath.

One disadvantage with the vatting of vat dye using the reductants mentioned is the high contamination of the dyehouse wastewater with sulfate (from about 3500 to 5000 mg/l, measured in the wastewater of an indigo dyehouse) in the case of hydrosulfite or with oxygen-consuming substances (COD about 8000 mg/l, measured in the wastewater of an indigo dyehouse) in the case of hydroxyacetone.

For indigo, there have also been described pulverulent solid to pasty preparations of the leuco form, which comprise polyhydroxy compounds, such as glycerol., and especially sugar derivatives, for example molasses, mixed with alkali or zinc dust as stabilizers (DE-C-200 914 or -235 047). Furthermore, GB-B-276 023 discloses the preparation of pulverulent leuco dye preparations by heating a mixture of unreduced vat dye, glycol, alkali, hydrosulfite and sodium sulfate, drying in an open vessel and subsequent grinding.

The former preparations are effective in lowering the sulfate content of the dyehouse wastewater, but they are typically difficult to meter, since even the drying preparations tend to clump, and they are very slow to dissolve in the dyebath. With the latter preparations, the sulfate level is in fact increased, since these preparations, already comprising the sulfate from the reduction of the dye in the above-described mixture, have additional sulfate added to them.

WO-A-94/23114 discloses a dyeing process wherein indigo is used in a prereduced form, as an aqueous, alkaline solution obtained from catalytic hydrogenation. This eliminates the wastewater loading with organic substances, while the sulfate level is reduced to the amount of hydrosulfite required for the air contact during the dyeing process. However, it is disadvantageous that the leuco indigo solution used is oxidation-sensitive and has to be handled and stored in the absence of oxygen. In addition, the high water ballast of this solution is a hindrance as regards both storage and transportation.

Finally, WO-A-95/05421 describes leuco indigo preparations in granule form comprising leuco indigo and alkali metal hydroxide as essential components. These granules likewise do not always show satisfactory oxidation stability on prolonged storage in air, especially at high humidity.

Furthermore, DE-A-1 9502 968,unpublished at the priority date of the present invention, describes hydrosulfite-stabilized leuco indigo granules.

It is an object of the present invention to provide leuco vat dye preparations which do not have the disadvantages mentioned, which are oxidation-stable and which are advantageously useful for dyeing.

We have found that this object is achieved by leuco vat dye preparations in granule form comprising as essential constituents a leuco vat dye, an alkali metal hydroxide and a mixture of from 10 to 100% by weight of an α-hydroxy-$C_1$-$C_4$-alkylsulfinic acid, one of its salts or derivatives and from 0 to 90% by weight of hydrosulfite as reductant.

The present invention also provides a process for forming leuco vat dye preparations, which comprises jointly concentrating an aqueous alkaline solution of the leuco vat dye and a solution or suspension of the reductant in water and/or an organic solvent to dryness by thorough mixing in the absence of oxygen.

The present invention finally provides a process for dyeing cellulosic textile material, which comprises dyeing with leuco vat dye preparations.

The preparations of this invention generally comprise from 20 to 80% by weight, preferably from 50 to 70% by weight, of leuco vat dye, from 5 to 55% by weight, preferably from 5 to 20% by weight, of reductant and from 3 to 20% by weight, preferably from 4 to 10% by weight, of alkali metal hydroxide.

Suitable leuco vat dyes include not only the leuco forms of anthraquinonoid vat dyes but also the leuco forms of indigoid vat dyes.

Preferred examples of suitable vat dyes are C.I. Vat Green 9 and especially indigo and tetrabromoindigo (Brilliant Indigo).

The preparations of this invention include reductants comprising α-hydroxy-$C_1$-$C_4$-alkylsulfinic acids (hereinafter referred to as sulfinic acids for short), which are preferably comprised as salts, for example as alkaline earth metal salts such as magnesium or calcium salts, as zinc salts or especially as alkali metal salts such as sodium or potassium salts, but can also be used in the form of other derivatives, for example in the form of the reaction products with ammonia such as trisodium nitrilotrimethylsulfinate.

Specifically, preferred examples are α-hydroxyethylsulfinic acid, α-hydroxypropylsulfinic acid and α-hydroxybutylsulfinic acid and their sodium salts and especially hydroxymethylsulfinic acid and sodium hydroxymethylsulfinate.

Mixtures of the sulfinic acids can also be used, of course. The novel, sulfinic acid leuco vat dye preparations are notable for particular stability. They are so stable in preparation and in storage that they can not only survive long drying times but also be stored in hot moist air (fit for service in the tropics).

Novel preparations further comprising hydrosulfite as reductant are in addition particularly readily and quickly soluble (spontaneously soluble). Any portions reoxidized in the course of handling or dyeing are immediately reduced back.

Mixtures of the sulfinic acids with hydrosulfite preferably have a composition of from 85 to 15, particularly from 80 to 20, very particularly preferably from 60 to 40%, by weight of sulfinic acid and preferably from 15 to 85,particularly preferably from 20 to 80,very particularly preferably from 40 to 60%, by weight of hydrosulfite.

Suitable alkali metal hydroxides are in particular potassium hydroxide and especially sodium hydroxide. Mixtures of alkali metal hydroxides can also be used, of course.

The hydroxide converts the leuco vat dye into the readily soluble alkali metal salts. leuco indigo, for example, forms the mono-and/or disalt, depending on the amount of alkali metal hydroxide.

The molar ratio between leuco vat dye and alkali metal hydroxide is therefore advantageously within the range from about 1:1 to 1:10, preferably within the range from 1:1 up to the molar ratio required for converting into the salt form all the free hydroxyl groups present.

In general, reductant quantities distinctly below 50% by weight, especially of not more than 25% by weight, based on the leuco vat dye, are sufficient to stabilize the leuco vat dye during storage of the granule preparation (protection against reoxidation). A reductant quantity at the upper end of the range of the weight content mentioned above for the preparations of this invention (from about 40 to 55% by weight), i.e., based on the leuco vat dye, of up to about 65% by weight, and sulfinic acid and hydrosulfite as a common reductant in which the hydrosulfite content is at least 50% by weight, will ensure that the portion of the vat dye inevitably reoxidized by air contact during the dyeing process is directly offset, so that no further reductant has then to be added to the dyebath. This reductant quantity can be varied slightly to optimize it to whichever dyeing machine is used.

For instance, in the case of the particularly preferred leuco indigo preparation, the amount of the preferred reductant mixture of sodium hydroxymethylsulfinate and hydrosulfite required for stabilization is generally within the range from 5 to 30% by weight, in particular from 10 to 20% by weight, based on leuco indigo, which corresponds to a preparation having a preferred composition of from 55 to 75% by weight of leuco indigo, from 10 to 20% by weight of the reductant mixture and from 10 to 20% by weight of alkali metal hydroxide.

The leuco vat dye preparations of this invention constitute readily meterable, storage-stable (stable for several weeks at 50° C. in the presence of air) dye preparations which, compared with the unreduced vat dye, contaminate the dyehouse wastewater to a significantly lesser extent and dissolve rapidly in the dyebath.

The essential requirement to stabilize the leuco vat dye against reoxidation is its permanent and uniform thorough mixing with the reductant, which is ensured by the granule form of this invention (which typically comprises predominantly spherical particles having an average particle size of from in general 0.1 to 2 mm, preferably from 0.5 to 1.5 mm).

In the case of the novel preparations which comprise hydrosulfite as well as sulfinic acid, the proportion of hydrosulfite which only serves to compensate the reoxidation during dyeing can be subsequently mixed as a solid into the granules already sufficiently stabilized by the reductant mixture or the sulfinic acid alone. These mixtures are particularly simple to adapt to the requirements of the particular dyeing machine.

The leuco indigo preparations of this invention can be advantageously formed by directly drying the aqueous solution obtained from the preparation of leuco indigo or its derivatives by catalytic hydrogenation after the catalyst has been separated off.

The catalytic hydrogenation itself can be carried out for example, as commonly known, by reduction of an alkaline indigo paste (customarily from 10 to 35% by weight of indigo, from 2 to 10% by weight of alkali metal hydroxide) using Raney nickel as catalyst at a hydrogen pressure of from generally 2 to 10 bar and a temperature of from generally 60 to 90° C.

The resulting leuco indigo solutions generally comprise from 10 to 35, preferably from 15 to 30, particularly preferably from 20 to 25%, by weight of leuco indigo.

Leuco vat dye starting solutions suitable for drying can be obtained in a similar manner in the case of anthraquinonoid vat dyes too.

In the novel process for forming leuco vat dye preparations, the alkaline leuco vat dye solutions are concentrated to dryness together with a solution or suspension of the selected reductant in water and/or an organic solvent in the absence of oxygen, preferably after inertization with a protective gas such as nitrogen, and by thorough mixing.

The leuco vat dye solution and the reductant solution (or suspension) is preferably mixed before or during the drying process, but the reductant can also be added directly as solid to the leuco vat dye solution.

Suitable organic solvents for forming the reductant solution or suspension include especially water-miscible solvents. Preferred examples are $C_1$–$C_4$-alcohols, especially methanol, and also glycols, especially ethylene glycol, and glycol ethers, which can of course also be used in the form of mixtures.

A further interesting process variant comprises forming the sulfinic acid or its salt in situ in the course of the drying of the leuco indigo solution.

This can be done in a simple manner by adding hydrosulfite, the corresponding $C_1$–$C_4$-aldehyde (mono- or dialdehyde) such as formaldehyde, glyoxal, acetaldehyde, propionaldehyde, malonaldehyde, butyraldehyde or succinaldehyde and alkali metal hydroxide to the leuco indigo solution in suitable mixing ratios.

The reaction taking place in the course of the drying will now be illustrated using the preferred hydroxymethylsulfinic acid as an example by means of the following reaction equation:

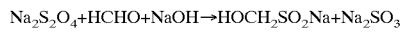

$$Na_2S_2O_4 + HCHO + NaOH \rightarrow HOCH_2SO_2Na + Na_2SO_3$$

If less than the stoichiometrically required amount of aldehyde is added, then the preparation obtained after the drying will comprise sulfinic acid and hydrosulfite as reductant.

The product temperature required for the drying depends on whether or not reduced pressure is employed and customarily ranges from 50 to 90° C. if it is employed and from 105 to 130° C. if it is not.

During the drying process, thorough mixing of the liquid phase and of the resulting solid has to be ensured.

Suitable large-scale apparatus therefore includes for example tumble dryers, paddle dryers and force-cleaned contact dryers, in each of which the drying is preferably carried out under reduced pressure (from about 10 to 500 mbar). It is generally advisable to follow up the actual drying with an afterdrying time of from about 1 to 2 h at the particular drying temperature chosen. If necessary, an additional coarse comminution can be carried inside or outside the drying apparatus.

The process of this invention can also be carried out to advantage in a spray dryer such as a spray tower and especially a fluidized-bed spray granulator wherein the water is vaporized with a hot inert gas, preferably nitrogen. The dried product can in this case be obtained directly in the desired particle size.

It is advisable to cool the dried product to generally <50° C. before it is discharged in order that any reoxidation in the hot state may be avoided.

The process of this invention provides a simple way of continuously producing the novel leuco vat dye preparations in granule form. In general, the dried products have only a small unreduced vat dye content (about <4% by weight).

The leuco vat dye preparations of this invention are advantageously useful for dyeing cellulosic textile material. The dyeings obtained fully meet the requirements. The level of sulfur-containing inorganic compounds in the wastewater is dramatically reduced compared with the use of unreduced dyes. Depending on the composition chosen for the leuco vat dye preparation, dyeing can also be carried out without further addition of reductant to the dyebath.

EXAMPLES

A) Preparation of leuco indigo preparations according to this invention

Example 1

A solution of 21% by weight of leuco indigo (calculated as free acid), 4% by weight of sodium hydroxide, 1.85% by weight of sodium hydroxymethylsulfinate (99% pure), 1.85% by weight of hydrosulfite (calculated 100%) and 71.3% by weight of water was gradually introduced at 10 mbar into a nitrogen-inertized rotary evaporator heated to an oilbath temperature of 120° C. and concentrated to dryness at a speed of 70 rpm. Following an afterdrying time of 2 h in the stated conditions, the temperature was reduced to <40° C.

The granules obtained following coarse comminution had an average particle size of 2 mm. Extraction with water in a Soxleth revealed a water-insoluble content (by-products and re-oxidized indigo) of <1% by weight. The granules comprised about 72.4% by weight of leuco indigo, 4.3% by weight of sodium hydroxymethylsulfinate, 4.3% by weight of hydrosulfite and 13.8% by weight of sodium hydroxide.

Example 2

A solution of 22% by weight of leuco indigo (calculated as free acid), 7% by weight of sodium hydroxide, 4% by weight of hydrosulfite (87% pure) and 1.9% by weight of formaldehyde in the form of a 30% strength aqueous solution was dried similarly to Example 1.

The granules obtained following coarse comminution had an average particle diameter of 1.5 mm. Extraction with water in a Soxleth revealed a water-insoluble content of <4% by weight. The granules comprised about 64% by weight of leuco indigo, 7% by weight of sodium hydroxymethylsulfinate, 7% by weight of sodium sulfite and 20% by weight of sodium hydroxide.

Example 3

A solution of 21% by weight of leuco indigo (calculated as free acid), 4.5% by weight of sodium hydroxide and 74.5% by weight of water was admixed with 3.2% by weight of nitrilotrimethylsulfinic acid (calculated 100% as 20% strength by weight aqueous solution) and then dried similarly to Example 1.

The granules obtained following coarse comminution had an average particle diameter of 1.5 mm. Extraction with water in a Soxleth revealed a water-insoluble content of about 4% by weight. The granules comprised about 73% by weight of leuco indigo, 11% by weight of nitrilotrimethanesulfinic acid and 15% by weight of sodium hydroxide.

Example b 4

A solution of 22% by weight of leuco indigo (calculated as free acid), 5% by weight of sodium hydroxide, 3.3% by weight of sodium hydroxymethylsulfinate (99% pure) and 69.7% by weight of water was dried similarly to Example 1.

The granules obtained following coarse comminution had an average particle diameter of 1.5 mm. Extraction with water in a Soxleth revealed a water-insoluble content of <1% by weight. The granules comprised about 71% by weight of leuco indigo, 10.5% by weight of sodium hydroxymethylsulfinate and 16.5% by weight of sodium hydroxide.

B) Dyeing with leuco indigo preparations according to this invention

Example 5

The dyeing was carried out in a customary indigo dyeing range with just one bath of 2000 l liquor capacity, fourfold dipping and oxidizing (4 passes). The throughput of 4000 ends of metric count 12 raw cotton yarn was 600 kg/h. The fixed indigo content was 1.8%.

Under these production conditions (standard), the leuco indigo granules of Example 1 and, in a further run, the leuco indigo granules of Example 2 were continuously sprinkled into the dyebath at 23.5 kg/h during the 8 h duration of the experiment to maintain the previously established steady-state (constant) conditions. Additional reductant and base only had to be used in half the amount required for the standard dyeing with unvatted dye. The dyed yarn showed the same hue, depth of shade and fastness as a yarn dyed in a conventional manner under constant addition of 65 kg/h of leuco indigo solution 20% (calculated as free acid)

4 kg/h of 88% strength hydrosulfite 15 l/h of 38 ° Be sodium hydroxide solution.

We claim:

1. Leuco vat indigo preparations in granule form comprising as essential constituents leuco indigo or a leuco form of an indigo derivative, an alkali metal hydroxide and a mixture of from 10 to 100% by weight of an α-hydroxy-$C_1$–$C_4$-alkylsulfinic acid, one of its salts or derivatives and from 0 to 90% by weight of hydrosulfite as reductant.

2. Preparations as claimed in claim 1, comprising from 20 to 80% by weight of leuco indigo, from 3 to 20% by weight of alkali metal hydroxide and from 5 to 55% by weight of reductant.

3. Preparations as claimed in claim 1, wherein the α-hydroxy-$C_1$–$C_4$-alkylsulfinic acid is hydroxymethylsulfinic acid or a salt thereof.

4. A process for forming leuco indigo preparations as claimed in claim 1, which comprises jointly concentrating an aqueous alkaline solution of leuco indigo or the leuco form of a leuco indigo derivative and a solution or suspension of the reductant in water and/or an organic solvent to dryness by thorough mixing in the absence of oxygen.

5. A process as claimed in claim 4 in an inert gas atmosphere and/or under reduced pressure.

6. A process as claimed in claim 4, wherein the leuco indigo solution is mixed with hydrosulfite, a $C_1$–$C_4$-aldehyde, additional alkali metal hydroxide and water and the α-hydroxy-$C_1$–$C_4$-alkylsulfinic acid is prepared in situ in the course of the drying.

7. A process as claimed in claim 4 in a spray dryer.

8. A process for dyeing cellulosic textile material, which comprises dyeing with leuco indigo preparations as claimed in claim 1.

* * * * *